United States Patent
Kucinic et al.

(10) Patent No.: US 10,450,174 B1
(45) Date of Patent: Oct. 22, 2019

(54) HOISTING DEVICE AND BOLT FOR USE THEREWITH, METHOD OF MAKING AND USING THE SAME

(71) Applicant: Jergens, Inc., Cleveland, OH (US)

(72) Inventors: Bob Kucinic, Solon, OH (US); Darel R. Taylor, Painesville, OH (US); Grzegorz Fedorowicz, Parma, OH (US)

(73) Assignee: Jergens, Inc., Cleveland, OH (US)

( * ) Notice: Subject to any disclaimer, the term of this patent is extended or adjusted under 35 U.S.C. 154(b) by 55 days.

(21) Appl. No.: 15/493,839

(22) Filed: Apr. 21, 2017

Related U.S. Application Data (63) Continuation of application No. 14/861,133, filed on Sep. 22, 2015, now abandoned.

(60) Provisional application No. 62/060,665, filed on Oct. 7, 2014.

(51) Int. Cl.
- *F16B 31/02* (2006.01)
- *B66F 1/00* (2006.01)
- *B66C 13/16* (2006.01)

(52) U.S. Cl.
CPC ............... *B66F 1/00* (2013.01); *B66C 13/16* (2013.01); *F16B 31/02* (2013.01); *F16B 31/025* (2013.01)

(58) Field of Classification Search
CPC . B66C 1/66; B66C 13/16; B66C 1/666; F16B 31/025; F16B 31/02; G01L 1/24; Y10T 403/32213; Y10T 403/32975; F16G 15/08; F16G 15/00; Y10S 116/34
See application file for complete search history.

(56) References Cited

U.S. PATENT DOCUMENTS

| | | | |
|---|---|---|---|
| 2,600,029 A | 6/1952 | Stone | |
| 3,224,316 A * | 12/1965 | Grikscheit | F16B 31/02 116/212 |
| 3,297,293 A | 1/1967 | Andrews | |
| 3,474,701 A | 10/1969 | Setzler | |
| 3,492,033 A | 1/1970 | Mueller | |
| 3,602,186 A | 8/1971 | Popenoe | |
| 3,799,108 A | 3/1974 | Mosow | |
| 3,812,758 A | 5/1974 | Bossler, Jr. | |
| 3,823,639 A | 7/1974 | Liber | |
| 3,850,133 A | 11/1974 | Johnson | |
| 3,886,840 A | 6/1975 | Bossler | |
| 3,908,508 A * | 9/1975 | Payne | F16B 31/025 116/212 |
| 3,987,668 A | 10/1976 | Popenoe | |
| 3,987,699 A | 10/1976 | Popenoe | |
| 4,002,139 A | 1/1977 | Payne | |

(Continued)

*Primary Examiner* — Robert Canfield
*Assistant Examiner* — Charissa Ahmad
(74) *Attorney, Agent, or Firm* — Rankin, Hill & Clark LLP (57) ABSTRACT

A hoist ring assembly and related methods of lifting a load wherein the hoist ring assembly includes a bolt for securing the hoist ring assembly to the load and the bolt includes a tensile stress indicator for showing the tensile stress on the bolt when the bolt is tightened onto the load. The hoist ring assembly can further include a radio-frequency identification tag used for communicating information relating to the hoist ring assembly. The methods include using the tensile stress indicator to achieve and maintain a predetermined preload of the bolt, and using the radio-frequency identification tag to obtain historical recorded information relating to the hoist ring assembly.

18 Claims, 3 Drawing Sheets

(56) References Cited

U.S. PATENT DOCUMENTS

| | | |
|---|---|---|
| 4,041,776 A | 8/1977 | Payne |
| 4,100,666 A | 7/1978 | Payne |
| 4,114,428 A * | 9/1978 | Popenoe .................. G01B 7/22 331/65 |
| RE30,183 E | 1/1980 | Popenoe |
| 4,431,352 A | 2/1984 | Andrews |
| 4,558,979 A | 12/1985 | Andrews |
| 4,592,686 A | 6/1986 | Andrews |
| 4,705,422 A | 11/1987 | Tsui |
| 4,771,999 A | 9/1988 | Takeuchi |
| 4,793,751 A | 12/1988 | Takeuchi |
| 4,899,591 A * | 2/1990 | Kibblewhite ....... B25B 23/1425 29/594 |
| 4,904,132 A | 2/1990 | Popenoe |
| 5,189,979 A | 3/1993 | Popenoe |
| 5,222,849 A * | 6/1993 | Walton .................. F16B 31/025 411/14 |
| 5,226,765 A * | 7/1993 | Walton .................. F16B 31/025 116/212 |
| 5,286,130 A | 2/1994 | Mueller |
| 5,291,789 A * | 3/1994 | Walton .................. F16B 31/025 73/761 |
| 5,352,056 A | 10/1994 | Chandler |
| 5,405,210 A | 4/1995 | Tsui |
| 5,584,627 A | 12/1996 | Ceney |
| 5,586,801 A | 12/1996 | Sawyer |
| 5,606,132 A | 2/1997 | Simpson |
| 5,634,734 A | 6/1997 | Schron, Jr. et al. |
| 5,848,815 A | 12/1998 | Tsui et al. |
| 5,975,786 A | 11/1999 | Chang |
| 6,068,310 A | 5/2000 | Fuller et al. |
| 6,443,514 B1 | 9/2002 | Fuller et al. |
| 6,652,012 B1 | 11/2003 | Fuller et al. |
| 6,749,237 B1 | 6/2004 | Ma |
| 7,412,898 B1 | 8/2008 | Smith |
| 7,958,614 B2 | 6/2011 | Popenoe |
| 8,024,980 B2 | 9/2011 | Arms |
| 8,757,693 B2 | 6/2014 | Fuller |
| 9,032,805 B2 | 5/2015 | Wakeman |
| 9,046,433 B2 | 6/2015 | Hsieh |
| 9,067,766 B1 | 6/2015 | Bateman |
| 2006/0022056 A1 | 2/2006 | Sakama |
| 2012/0051835 A1 | 3/2012 | Taylor |

* cited by examiner

HOISTING DEVICE AND BOLT FOR USE THEREWITH, METHOD OF MAKING AND USING THE SAME

CROSS-REFERENCE TO RELATED APPLICATIONS

This application is a continuation of U.S. application Ser. No. 14/861,133 filed Sep. 22, 2015 (still pending), which claims priority to U.S. Provisional Patent Application No. 62/060,665, which was filed Oct. 7, 2014 and which are incorporated herein by reference.

FIELD

The invention of this application relates to hoisting devices and, more particularly, to bolts used in hoisting devices to secure the hoisting device to an object to be lifted, along with methods for making and using the same.

BACKGROUND OF THE INVENTION

There are a wide range of lifting/hoisting devices and configurations used to secure a ring or other clasping or coupling member to an object to be lifted (i.e. the "load"). Such hoisting devices include for example, center-pull and side-pull hoist ring assemblies. These hoist ring assemblies can be attached to a variety of heavy loads or objects, such as die sets and molds. The hoist ring assemblies usually include an integral load-carrying or load-lifting ring, clevis, bail, hook, loop, or similar clasping or coupling element. The load may be lifted with a lifting mechanism (e.g. a hoist), which can be connected to the coupling element of the hoist ring assembly in order to lift the object.

A large number of hoist ring assemblies have been developed that include a load-carrying ring, wherein the hoist ring assemblies, or parts thereof can pivot and/or swivel for the purpose of adjusting the orientation of the coupling element with respect to the force vector being applied to the coupling element during the lifting procedure. Various such hoist ring assemblies are found in patent documents discussed in more detail below, and which are incorporated herein by reference.

Center-pull hoist ring assemblies conventionally include a post assembly comprising a threaded bolt, a support member, and the load-carrying ring. The support member connects the ring to the post assembly. The threaded bolt of the post assembly engages a threaded opening in the load. The ring is used to attach the hoist ring assembly to the lifting mechanism. The support member, which carries the load-carrying ring, can swivel 360 degrees about a longitudinal axis of the bolt, thus allowing the ring to swivel to the same extent. Further, the support member often carries the ring such that the ring can pivot about a ring axis that is generally orthogonal to the longitudinal axis of the bolt. In this respect, the ring can have a pivot arc (i.e. "bail angle") of about 180 degrees.

Like the center-pull style, conventional side-pull hoist ring assemblies include a rotating support member mounted by a post assembly onto the object to be lifted. In a side-pull hoist ring, the support member can be generally U-shaped to define an outer bite portion in the bottom of the U-shaped support member and in which a circular load bearing ring can be pivotally mounted. The circular load bearing ring is offset from the center axis of the post assembly.

Prior devices are those shown in Schron Jr. et al. U.S. Pat. No. 5,634,734 that discloses a center-pull style hoist device, which is incorporated herein by reference for showing the same. Also incorporated herein by reference are the devices shown in Ma U.S. Pat. No. 6,749,237, in Tsui U.S. Pat. Nos. 5,405,210 and 5,848,815, in Sawyer et al. U.S. Pat. No. 5,586,801, and in Chandler U.S. Pat. No. 5,352,056, which all show different styles of center-pull hoist ring assemblies.

Fuller et al U.S. Pat. No. 6,652,012; Fuller et al. U.S. Pat. No. 6,443,514; and Fuller et al U.S. Pat. No. 6,068,310 all disclose side-pull hoisting devices and are incorporated by reference for showing the same. All of these devices disclose hoist ring assemblies that have been used effectively in the industry for many years and which are provided as background for the invention of this application.

In addition to the above-described hoisting devices, also known in the patent art are patents to Mueller U.S. Pat. Nos. 5,286,130, and 3,492,033, which disclose clevis hoist ring assemblies. The Mueller patents are incorporated by reference for showing additional types of hoist ring assemblies that could be utilized in the invention of this application.

While hoist ring assemblies are designed to be very robust, every assembly has a predetermined load limit determined by the manufacturer, which is based on various factors including the size and design of the load-bearing ring. If a predetermined load limit of the assembly is exceeded, failure of the assembly can result. Such failure can include for example, the load-bearing ring being damaged. Conventionally, the bolt for the hoist ring assembly may be chosen to correspond to the load limit of the load bearing ring and/or to other components of the hoist ring assembly. Thus, hoist ring assemblies include a specific bolt of a particular size and rating.

The overall performance of the hoist ring assembly, the services life of the bolt, and the service life of the load bearing ring can depend on the proper tensile stress being exerted on the bolt from being threaded into the threaded opening of the object to be lifted. This tensile stress exerted on the bolt causes elongation of the bolt and is known as the "preload" or "designed tension" of the bolt.

In use, it is important to attach the bolt to the load to the proper preload in order to prevent fatigue failure of the joint, joint separation, or self-loosening of the bolt due to vibration. Therefore, bolts are configured to be tightened to a specific preload, which is the amount of tensile stress applied to the bolt during tightening that results in a fully tightened bolt without over tightening the bolt. When the preload is reached, the bolt is considered to be optimally tightened in a threaded opening. Attaining proper preload is important because when attained, the bolt does not carry the full weight of an applied load. Rather, only a percentage of the weight of the load is carried by the preloaded bolt. Conversely, when bolts are not preloaded, the full weight of an applied load is carried by the bolt.

The amount of torque (i.e. "tightening torque") that is used to turn the bolt in the threaded opening has conventionally been measured and accepted as an approximation of the tensile stress on the bolt and used to determine whether the appropriate preload has been reached. While there are many tools available in the art to accurately test tightening torque applied to the bolt, torque is not the most precise measurement of tensile stress on the bolt because of variable friction factors between the bolt and the threaded opening of the load. Furthermore, such torque measurement tools are often cumbersome to use and taking the measurements take a considerable amount of time and effort, thereby reducing operational efficiencies.

Because of these deficiencies and/or because of the lack of proper measuring equipment, some end users do not properly conduct testing of tightening torque of the bolt. Additionally, tightening torque is conventionally only measured at a single time, namely, when the bolt is tightened in the opening of the object to be lifted. In this aspect, there is no way to assess whether or not the bolt is under adequate tensile stress at a time after the bolt is tightened into the threaded opening.

Therefore, there is a need for improvement in testing for the proper tensile stress on the bolt of a hoist ring assembly.

SUMMARY OF INVENTION

The invention of this application relates to hoist ring assemblies that include a mechanism to assess the proper tensile stress of a bolt when it is strained by the tightening of the bolt into a threaded opening of a load. In accordance with the present subject matter, the bolt itself can include a tensile stress indicator. The tensile stress indicator (also referred to herein as an "elongation gauge") can be monitored to accurately and quickly determine if the preload has been achieved when tightening the bolt onto an object to be lifted, and can be used to continuously/intermittently monitor the tensile stress on the bolt over time, such as over the service life of the bolt or hoist ring assembly.

The invention also includes a bolt and hoist ring combination, wherein the combination includes a radio-frequency identification (RFID) tag or chip that can be used to transfer information about the assembly—such as the current tensile stress on the bolt—to an end user and/or to a supplier of the hoist ring assembly.

In one aspect in accordance with the present subject matter, a hoist ring assembly is provided. The hoist ring assembly comprises a bolt including a head, a shank, and an axial bore extending from the head and into the shank. The axial bore includes a first end defining an opening at the head of the bolt, the opening being covered by a window, and a second distal end. The hoist ring assembly includes a tensile stress indicator that is visible through the window and adapted to indicate a tensile stress in the bolt. The tensile stress indicator includes an actuating rod positioned in the axial bore. A lower end of the actuating rod is fixed to the bolt at the second distal end of the axial bore. An upper end of the actuating rod includes an indicating surface. The tensile stress indicator includes light-absorbing fluid positioned in the axial bore. The hoist ring assembly includes a bushing mounted on the bolt and including a stem and a flange. The hoist ring assembly includes a washer mounted on the bolt between the head of the bolt and the bushing. The hoist ring assembly includes a ring body rotatably mounted on the stem of the bushing between the washer and the flange of the bushing. The hoist ring assembly includes a U-bar pivotally mounted to the ring body. The bolt has a predetermined preload, the hoist ring assembly has a predetermined load limit, and the load limit of the hoist ring assembly is less than the preload of the bolt. When the tensile stress in the bolt is zero, the indicating surface is adjacent to the window and is visible through the window. When the bolt is subject to tensile stress, the indicating surface is pulled away from the window thereby creating a gap between the indicating surface and the window, the light-absorbing fluid enters the gap, and the light-absorbing fluid in the gap is visible through the window. When the tensile stress in the bolt reaches the preload, the indicating surface is not visible through the window.

The hoist ring assembly can further including a radio-frequency identification tag secured to the bolt for recording information relating to the hoist ring assembly.

In another aspect in accordance with the present subject matter, a method of lifting an object is provided. The method includes providing a hoist ring assembly comprising a bolt including a head, a shank, and an axial bore extending from the head and into the shank. The axial bore includes a first end defining an opening at the head of the bolt, the opening being covered by a window, and a second distal end. The hoist ring assembly includes an actuating rod positioned in the axial bore. A lower end of the actuating rod is fixed to the bolt toward the second distal end of the axial bore. An upper end of the actuating rod includes an indicating surface. The hoist ring assembly includes light-absorbing fluid positioned in the axial bore, a bushing mounted on the bolt and including a stem and a flange, a washer mounted on the bolt between the head of the bolt and the bushing, a ring body rotatably mounted on the stem of the bushing between the washer and the flange of the bushing, and a U-bar pivotably mounted to the ring body. The bolt has a predetermined preload, the hoist ring assembly has a predetermined load limit, and the load limit of the hoist ring assembly is less than the preload of the bolt. When the tensile stress in the bolt is zero, the indicating surface is adjacent to the window and is visible through the window. The method includes tightening the bolt in a threaded opening of an object to be lifted, wherein the bolt is subject to tensile stress during tightening such that the indicating surface moves away from the window to thereby create a gap between the indicating surface and the window and wherein the light-absorbing fluid enters the gap and is visible through the window. The method includes determining if the predetermined preload of the bolt has been achieved based on an amount of the light-absorbing fluid in the gap, and if the predetermined preload of the bolt has not been achieved, the method then includes adjusting the bolt relative to the threaded opening in order to achieve the predetermined preload of the bolt. The method includes lifting the object using the hoist ring assembly when the predetermined preload of the bolt is achieved.

The method can also include determining if the predetermined preload of the bolt is maintained over time, i.e. after initially tightening the bolt to the load with the proper amount of preload.

While the summary of the invention and the description herein relate to preferred embodiments and uses, the hoist ring assemblies of this application can come in many forms. Further, the bolt of this application has applications beyond those disclosed in this application, wherein it should not be limited to the disclosed embodiments.

These and other objects, aspects, features, developments and advantages of the invention of this application will become apparent to those skilled in the art upon a reading the description set forth below, taken together with the associated drawings.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

The invention relates to hoist ring assemblies including a tensile stress indicator that allows for the proper tightening of bolts that are used to secure the hoist ring assemblies to objects to be lifted. While the invention has been found to work particularly well with hoist rings, wherein it is being described below in connection with center pull hoist rings, the invention has broader applications and may be used for a wide variety of lifting applications wherein bolt tightening for lifting loads is important.

More particularly, the invention relates to a hoist ring assembly, a corresponding bolt, and loads associated with the use of the hoist ring assembly. A tensile stress indicator is utilized to evaluate elongation of the bolt and to determine the tensile stress on the bolt when the bolt is tightened into a threaded opening in the load. The tensile stress indicator can be used to ensure that the proper preload of the bolt has been reached during tightening and is maintained over time.

In accordance with the present subject matter, the hoist ring assemblies are configured to be used many times during their designed service life and can be used to lift heavy loads. Therefore, the hoist ring assemblies are adapted for repetitive uses, namely, repeatedly being attached to and detached from an object to be lifted, and repeatedly being used to lift the load. In this manner, the bolt is configured to be tightened and loosened in a threaded opening of the load and to withstand the variable and repetitive lifting loads on the hoist ring assembly. Similarly, the tensile stress indicator may be configured to continuously measure the tensile stress on the bolt.

In several embodiments, the hoist ring assembly is designed to have a specified load limit, which is the maximum recommended weight of a load to be lifted by the hoist ring assembly as determined by the manufacturer. In other words, the load limit of the hoist ring assembly is a force that is less by a certain factor (usually ¼, ⅕, or ⅙) than that which would cause the hoist ring assembly to fail or yield. The load limit of the hoist ring assembly may be dependent in part, on the bolt, and can be determined in accordance with ASME B30.26.

Conventionally, bolts are rated in various ways including ratings related to the proof load, yield strength, and ultimate tensile strength of the bolt. The ultimate tensile strength is the maximum tensile force that can be applied to the bolt without fracturing the bolt. The yield strength is the tensile force that produces a specified amount (usually about 0.2%) of permanent deformation within the bolt. The proof load is the maximum tensile force that can be applied without resulting in plastic deformation of the bolt. The proof load is typically about 85-95% of the yield strength.

In accordance with the present subject matter, the proof load of the bolt may be about 4-8 times, or about 5 times the load limit of the hoist ring assembly. For example, if the proof load of the bolt is about 5000 pounds (lb), then the hoist ring assembly can be designed to lift a load, or be designated as having a load limit of about 1000 lb. That is, the load limit of 1000 lb for the hoist ring assembly is 20% of the proof load of 5000 lb for the bolt. If a load of less than 5000 lb is lifted, which is likely the case when the load limit of the hoist ring assembly is 1000 lb, then the bolt will not fail (i.e. undergo more than 0.2% deformation).

In these embodiments, the tensile stress indicator can be configured to provide an indication that the preload of the bolt is reached. Accordingly, as the bolt is tightened onto to the load, the tensile stress indicator will indicate the tensile stress on the bolt and whether or not the bolt has been tightened to reach the proper preload. When the tensile stress indicator provides indicia that the preload has been reached, an operator can cease tightening the bolt so that over-tightening of the bolt can be prevented. In one aspect, the tensile stress indicator also provides indication that the bolt has been over-tightened past the designated preload.

In one aspect, the preload of the bolt can range anywhere from about 30-90%, or about 60% of the proof load of the bolt. In this way, lifting the weight of the load (wherein the load limit may be capped at 20% of the proof load) will not interfere with operation of the tensile stress indicator. This is because as is conventional, the weight of the load will not significantly increase the tensile stress on the preloaded bolt unless the weight of the load exceeds the preload.

This may be illustrated for example, where the proof load of the bolt is about 5000 lb, then the preload of the bolt will range from about 1500-4500 lb (i.e. 30-90% of 5000 lb), and will be tightened to this preload when attached to the load. The load limit of the hoist ring assembly will then be about 625-1250 lb (i.e. 12.5-25% of 5000 lb). In this scenario, because the load limit of 625-1250 lb for the hoist ring assembly is less than the preload of 1500-4500 lb for the bolt, then lifting a load between 625 lb and 1250 lb will not significantly increase the tensile stress on the bolt, and will thus not interfere with operation of the tensile stress indicator to indicate that the bolt is properly tightened to the preload.

In one embodiment, the load limit for the hoist ring assembly is less than the preload for the bolt. In accordance with the present subject matter, the load limit for the hoist ring assembly may be about 5-70%, about 10-50%, or about 25-35% of the preload for the bolt.

In one embodiment, the tensile stress indicator is included in the bolt. The bolt can include an internal mechanism to gauge the elongation of the bolt to determine the tensile stress on the bolt and if the bolt is properly tightened into a threaded opening. Suitable bolt/tensile stress indicator combinations are sold under the trademark SMARTBOLTS®, available from Stress Indicators Inc., 202 Perry Parkway, Suite 7, Gaithersburg, Md. 20877. In greater detail, SMART-BOLTS® bolts include a technology that allows for the assessment of tightening based on actual fastener elongation under load, i.e. engineering strain, instead of being based on tightening torque. Such determination of bolt tightening is more accurate than determinations based on torque testing. U.S. Pat. Nos. 3,602,186; 3,987,668; 3,987,699; Re 30,183; 4,904,132; 5,189,979; and 7,958,614 discloses these types of bolts and all of these patents are incorporated by reference into this application for showing the same.

Figure 1:
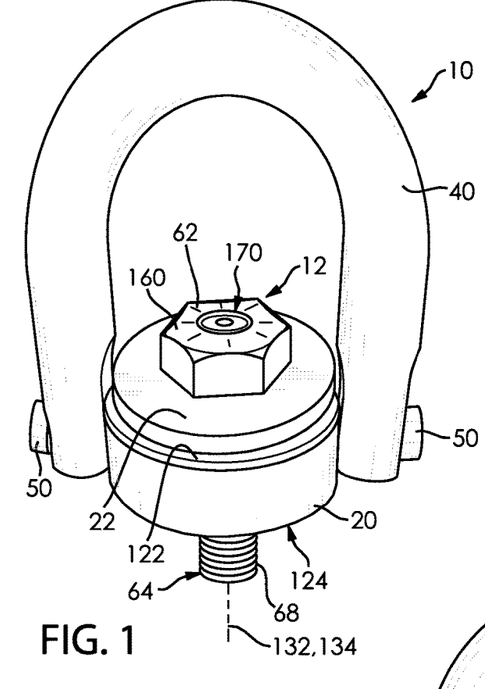
FIG. 1 is a perspective view of a center-pull hoist ring assembly showing certain aspects of the invention of this application.
Figure 2:
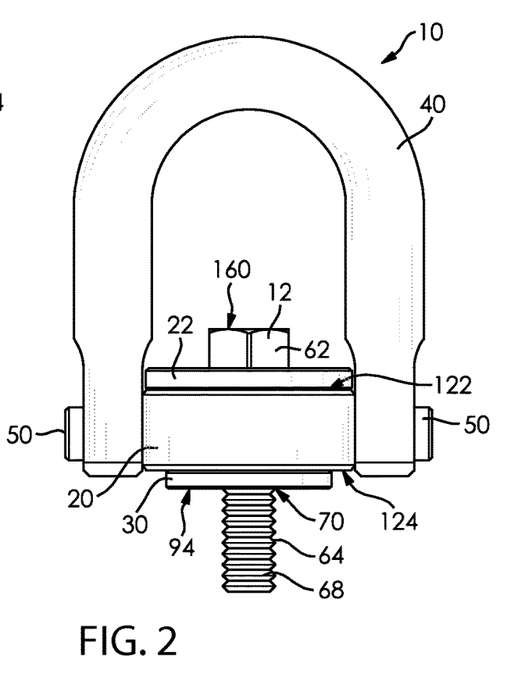
FIG. 2 is a side view of the hoist ring assembly shown in FIG. 1.
Figure 3:
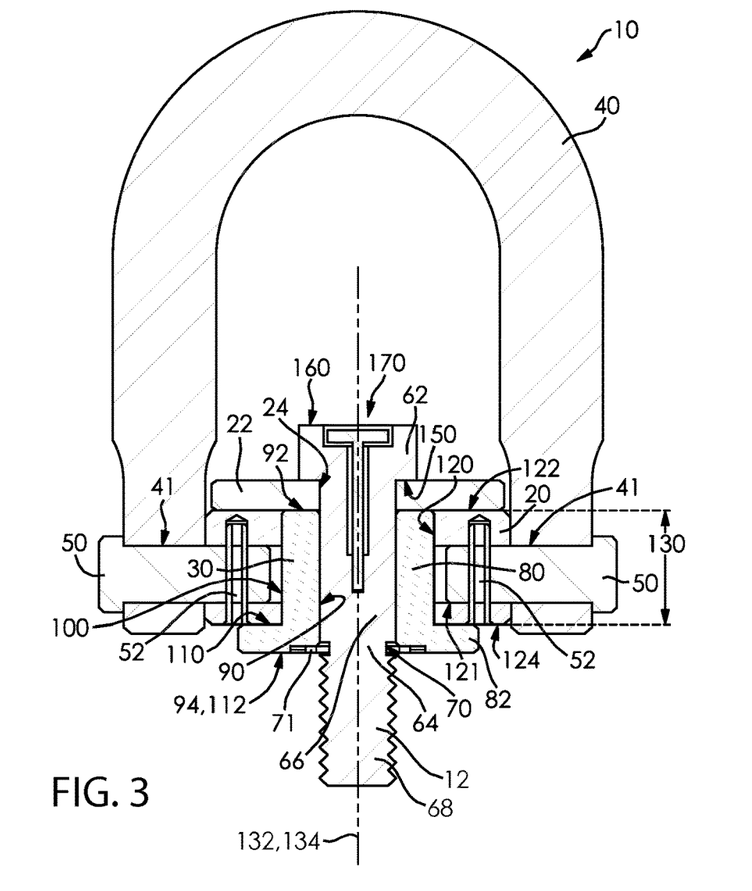
FIG. 3 is a center sectional view taken along a center line of the hoist ring assembly shown in FIGS. 1-2.
Figure 4:
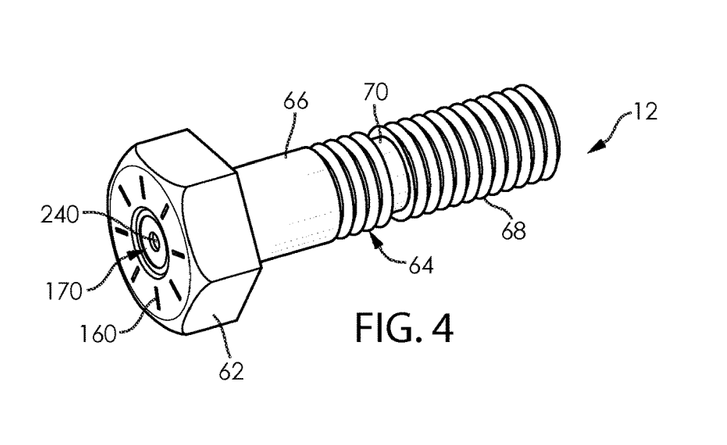
FIG. 4 is a perspective view of a bolt for use in a hoist ring assembly in accordance with the invention of this application.

Referring now to the figures, wherein the drawings are for the purpose of illustrating preferred and alternative embodiments of the invention only and are not for the purpose of limiting same, FIGS. 1-3 show a center-pull hoist ring assembly or hoist device for connection to a load (not shown) and FIGS. 4-7 show bolts that can be used in the hoist ring assembly. Again, while the invention is being disclosed in related to the preferred center-pull style hoist ring, the invention of this application can be used in connection with other hoisting assemblies wherein this description is not to be used to limit the invention of this application.

As shown, the hoist ring assembly 10 includes a bolt 12, a ring body 20, a washer 22, a bushing 30, and a bail or U-bar 40 for coupling the hoist ring assembly 10 to a lifting mechanism (not shown). While one particular type of U-bar is shown in the drawings, it will be understood that any lifting loop type structure known in the art could be utilized with the invention of this application. Accordingly, the term "U-bar" is intended to include all loop-, ring-, clasp-, or hook-like structures suitable for use in hoist ring assemblies.

The U-bar 40 is pivotably joined to the ring body 20 by U-bar pins 50 inserted through the holes 41 in the ends of the U-bar 40 and into cross holes 121 in the body 20. This configuration allows the U-bar 40 to pivot about the pins 50 with a bail angle of up to about 180°. As such, the pivotably mounted U-bar 40 can adjust to an orientation of a force vector being applied to the U-bar 40 during a lifting procedure. The U-bar pins 50 are held in place by locking pins 52 passing through holes in the U-bar pins 50 and corresponding holes in the ring body 20 as shown. It will be understood that the U-bar 40 can be secured to the body 20 by other means known in the art including the use of compression fittings, collets, or the like.

The washer 22 includes an opening 24, which is shaped to allow passage of the bolt 12 therethrough. As shown, the bolt 12 passes through the opening 24 in the washer 22 and through an opening 90 in the bushing 30, and is used to secure the hoist ring assembly 10 to a threaded hole in an object to be lifted. The bolt 12 includes a head 62 and a shank 64. Shank 64 includes a smooth or non-threaded section 66 and a threaded portion 68. The bolt 12 can further include a snap ring groove 70 on the shank 64 configured to accept a snap ring 71 for holding the bolt 12 relative to the bushing 30.

Bushing 30 includes a stem portion 80, a flange portion 82, and an opening 90. The opening 90 of the bushing 30 extends from a top extent 92 of the bushing 30 to a bottom extent 94 of the bushing 30. The stem portion 80 of the bushing 30 is adjacent to the top extent 92 of the bushing 30, and a flange portion 82 is adjacent to the bottom extent 94 of the bushing 30. While it is preferred that flange portion 82 is adjacent to the bottom extent 94 (or defines the bottom extent), this is not required and the orientation of the bushing 30 and washer 22 can be inverted so that the flange portion 82 of the bushing 30 is on top of the ring body 20 and the washer 22 is on the bottom of the ring body 20.

Stem portion 80 of the bushing 30 further includes an outer surface 100 that is radially smaller than the flange portion 82 of the bushing 30, wherein the flange portion 82 includes an upward annular surface 110 and a downward surface 112 that can also form bottom extent 94 and define a load-engaging surface. That is, the downward surface 112 of the flange 82 contacts a load when the bolt 12 is tightened into a threaded hole in the load. The stem portion 80 of the bushing 30 sits within an opening 120 of the ring body 20, and the flange portion 82 acts as a stop against a bottom extent 124 of the ring body 20 to limit the amount that the stem portion 80 of the bushing 30 enters in the opening 120 of the ring body 20.

The opening 120 of the ring body 20 extends from a top extent 122 to a bottom extent 124 of the body 20, and is sized to receive stem portion 80 of bushing 30. As can bee seen, the ring body 20 surrounds the stem surface 100 of the bushing 30 and is positioned between upward annular surface 110 of the flange portion 82 of the bushing 30 and the washer 22. The stem portion 80 of the bushing 30 has a stem length 130 as shown, which may be slightly larger than a height of the ring body 20 to allow the ring body 20 to rotate/swivel about its axis 132 even when the hoist assembly 10 is tightly connected to an associated load (not shown). The rotatably mounted ring body 20 may be able to fully swivel up to 360° about the axis 132. As such, the U-bar 40 connected to the ring body 20 would also able to fully swivel. In the embodiment shown, the axis 132 of the ring body 20 is coaxial with an axis 134 of the bolt 12.

As will be understood, because stem length 130 of the stem portion 80 of the bushing 30 is greater that a height of the ring body 20, clamping forces exerted by the bolt as it is tightening into a threaded hole, are directed not into the ring body 20, but into the stem portion and washer 22. As such, the ring body 20 is free to rotate/swivel about the bushing 30 on its axis 132.

Bolt 12 can have a wide range of configurations without detracting from the invention of this application. In accordance with the present subject matter, the bolt 12 is configured to secure hoist ring assembly 10 to an associated object to be lifted (not shown). Bolt 12 can comprise a wide range of fastening devices that are used in the art, and in several embodiments includes a threaded fastener that can be threaded into a threaded hole in the object to be lifted.

The bolt 12 includes a bolt head 62 that can be a hex head, as shown in FIGS. 4-7. A hex head has been found to work well with the hoist ring assembly 10 of this application, but such style of head is not required. Accordingly, any style of head could be utilized including internal or external torx heads, allen heads, twelve point external wrenching heads, and/or square socket heads, for example.

With particular reference to FIGS. 4-7, the head 62 of the bolt 12 includes a lower annular surface 150, which bears against the washer 22, and a top surface 160, which can have a top flat surface portion 162. Lower annular surface 150 is configured to engage washer 22 when the hoist ring assembly is tightened onto the associated object to be lifted and/or when the snap ring 71 secures the bolt 12 in relation to the bushing 30.

The size, shape, strength, predetermined preload, number and pitch of threads, and other variable relating to the bolt are not particularly limited by the present subject matter and can be selected based on the desired performance characteristics of the bolt 12 and/or the hoist ring assembly 10 as a whole, such as the load limit of the hoist ring assembly 10.

In regards to properly tightening the bolt, various charts are known that provide information on the relationship between the dimensions of the bolt and the specifications for the proper amount of torque that is to be applied to a bolt for proper tightening of a hoist ring assembly to an object to be lifted. For example, the torque that is to be applied to a bolt of a hoist ring assembly for proper tightening can be between 5 ft-lb and 2,100 ft-lb for bolts having a diameter of ¼ inch and 20 threads per inch, to a diameter of 2½ inches and 8 threads per inch. These example relationships between bolt size and torque are not exhaustive.

Figure 5:
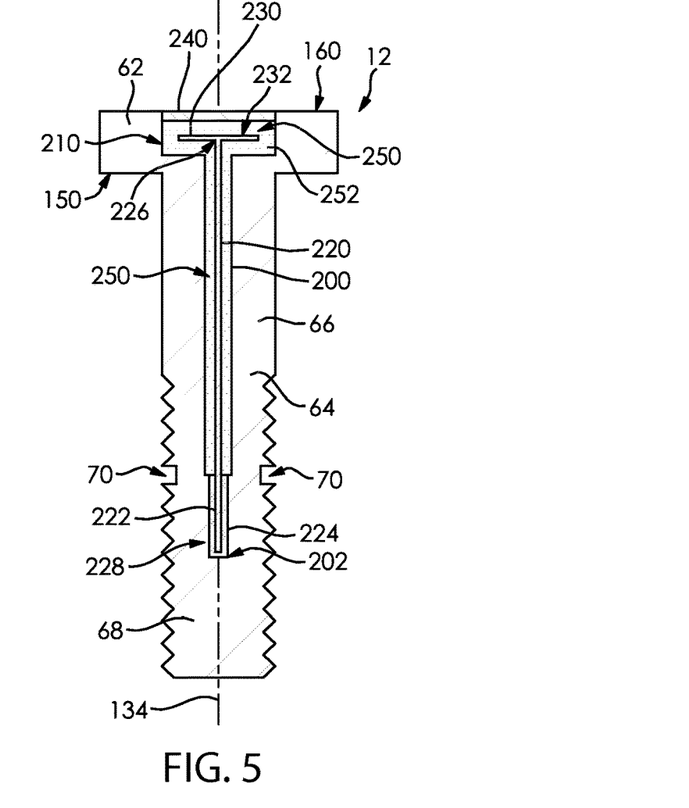
FIG. 5 is a sectional view taken along a center line of the bolt shown in FIG. 4.

It has been found however, that torque testing to determine the proper tightening of the bolt onto the load is not an ideal method. As such, bolt 12 further includes tensile stress indicator 170 that utilizes fastener elongation to determine the proper tightening of the bolt to achieve the predetermined preload for the bolt. It has been found that the measurement of fastener elongation due to tensile stress can better ensure that the proper preload of the bolt has been achieved. Further, subsequent monitoring of the fastener elongation using the tensile stress indicator 170 at a time removed from the initial tightening of the bolt to the load can ensure that the critical joint between the bolt and the load remains secure. Measurement of fastener elongation can be done by any method and/or system known in the art including those listed in U.S. Pat. Nos. 3,602,186; 3,987,668; 3,987,669; Re 30,183; 4,904,132; 5,189,979; and 7,958,614, which are incorporated by reference into this application.

Figure 6:
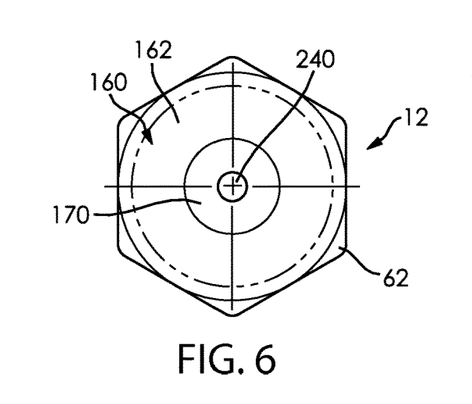
FIG. 6 is a top, head-end view of the bolt shown in FIG. 4.

The tensile stress indicator 170 can comprise a wide variety of gauges without detracting from the invention of this application, such as those referenced above. As an example and in reference to the various figures, a portion of the tensile stress indicator 170 is visible at the top surface 160 of the head 62 of the bolt 12. In this way, the tensile stress indicator 170 provides visual indication of the tensile stress at the top surface 160 of the bolt 12 as the bolt is tightened onto an associated object to be lifted. The tensile stress indicator 170 can indicate whether the recommended preload for the bolt has been reached, which is based on predetermined specifications as determined by the manufacturer. In one embodiment, the tensile stress indicator 170 can also indicate if the recommended preload for the bolt has been exceeded.

As shown, the bolt 12 includes an axial bore 200 that extends inwardly from the bolt head 62 and into the shank 64. The first end of the axial bore 200 defines an opening at the head 62 of the bolt, and a second end of the axial bore 200 defines a distal end 202 that terminates within the bolt 12 at or near the threaded portion 68 of the shank 64. The axial bore 200 can include an upper portion at the first end that defines a large recess 210 in head 62. The recess 210 has a diameter that is greater than a diameter of a remainder of the axial bore 200. The distal end 202 of the axial bore 200 includes a small diameter section 224 that has a diameter that is smaller than a remainder of the axial bore 200.

In another embodiment, the axial bore 200 does not terminate within the bolt 12, but rather extends all the way through the length of the bolt, from the head 62 to the bottom of the shank 64.

The tensile stress indicator 170 includes an actuating pin/rod 220 that is situated within the axial bore 200 of the bolt 12. The actuating pin 220 defines an upper end 226 and an oppositely situated lower end 222. The lower end 222 of the actuating pin 220 is attached to the bolt 12, preferably being secured to the small diameter section 224 of the axial bore 200. The attachment 228 between the lower end 222 of the actuating pin 220 and the bolt 12 can be by any method known in the art including, but not limited to, the lower end 222 of the actuating pin 220 being attached by adhesives, a friction fitting, or the like, to the small diameter section 224 of the axial bore 200. In several embodiments, other than the lower end 222 of the actuating pin 220 being attached to the small diameter section 224 of the axial bore 200, the actuating pin 220 is free from attachment to the bolt 12.

The upper end 226 of the actuating rod 220 terminates in an enlarged head/disc 230. The disc 230 of the actuating rod 220 is situated in the large recess 210 of the axial bore 200 in the bolt head 62. The disc 230 can have a face/indicating area 232 on its upper surface, which can include a highly visible coating(s) of a bright color. Any color can be used wherein a preferred embodiment includes use of the color red.

Tensile stress indicator 170 also includes a layer/window 240 of any suitably transparent or translucent material fixed relative to the top surface 160 of the bolt 12 to enclose the axial bore 200. The window 240 can be configured to be flush, or generally flush, with the flat surface portion 162 of the bolt head 62, but this is not required. The window 240 and the axial bore 200 collectively define a free space 250 between the actuating rod 220 and the wall of the axial bore 200. The free space 250 is substantially filled with a light-absorbing fluid 252 having an opaque color that is different from than the bright color of the indicating area 232 on the disc 230 of the actuating rod 220. In a preferred embodiment, the light-absorbing fluid 252 is a black opaque fluid, but this is not required.

In operation, when the bolt 12 is under no or little tensile stress, the disk 230 is in close proximity to the window 240 such that the light-absorbing fluid 252 is substantially excluded from between the disk 230 and the window 240 and is therefore substantially not visible through the window 240. Accordingly, the bright color of the indicating area 232 on the disc 230 is visible through the transparent window 240 to indicate that the bolt 12 is under no or little tensile stress.

As the bolt 12 is tightened into a threaded hole, the bolt 12 beings to elongate due to the tensile stress placed upon it. Accordingly, the joint between the lower end 222 of the actuating rod 220 and the small diameter section 224 of the axial bore 200 will operate to pull the actuating rod 220, such that the disc 230 begins to move away from the window 240. This movement of the actuating rod 220 thereby moves the indicating area 232 of the disc 230 away from the window 240 and creates a gap therebetween. The light-absorbing fluid 252 in the free space 250 thereby enters into the gap between the indicating area 232 and the window 240, and the color of the light-absorbing fluid 252 becomes visible through the window 240.

The increasing size of the gap between the indicating area 232 and the window 240, and the increasing amount light-absorbing fluid 252 entering the gap as a result of continued tightening of the bolt 12, will cause the color that is visible through the window 240 to transition from the color of the indicating area 232 (e.g. red) to the color of the light-absorbing fluid 252 (e.g. black).

The tensile stress indicator 170 can be calibrated such that when the bolt 12 is tightened to the specified preload, the color visible through the window 240 completely transitions to the color of the light-absorbing fluid 252 and does not display the color of the indicating area 232. In this way, the proper tightening of the bolt to the suggested preload can be visually determined using the tensile stress indicator 170. In one embodiment, the tensile stress indicator 170 also gives an indication that the bolt 12 has been over-tightened past the specified preload. This indication may allow a user to loosen the bolt 12 to achieve or maintain the proper preload.

Further, it has been found that the elongation of the bolt that is needed to change of the color visible through the window can be controlled by governing the optical density, opacity, or light-absorbing power of the light-absorbing fluid 252. In practice, the tensile stress indicator 170 can be readily calibrated to provide accurate measurements of tensile stress that are reproducible within 10 percent or less of the actual tensile stress being exerted on the bolt 12.

According to yet another set of embodiments, the invention can further include one or more marks on the top of the indicator to help identify when the hoist is safe to lift, which will be discussed more below. This can be used for a wide range of reasons including, but not limited to, allowing for use of the device even when color is difficult to distinguish, such as for users that are partially or fully color blind. Yet further, the one or more marks can be any type of indicia used to indicate proper tightening including, but not limited to, a trademark, a checkmark, a logo, a symbol, a letter code, an OK symbol, a word, a pattern and/or the like. This can include, but is not limited to, an image formed into and/or onto one or more portions of window 240 wherein the image is made visible when the fluid is present adjacent to the window.

In accordance with the present subject matter, the bolt 12 is specially configured to be used in a hoist ring assembly 10, wherein the bolt 12 is configured for the high stress environments to which the hoist ring assemblies are subject, and for the repetitive uses of these hoist ring assemblies. In this respect, it has been found that a special bolt configuration and method of making the bolt produces a durable bolt useful in these applications, and in combination with tensile stress indicator 170 produces a superior combination of performance characteristics.

In this respect, the bolt 12 can come in any conventional size and threaded arrangement. In a preferred embodiment, to provide a material with desired properties, the bolt 12 can be made from AISI or SAE 4140 grade steel, which is a low-alloy steel containing chromium and molybdenum as strengthening agents. In yet another embodiment, bolt 12 can be made from stainless steel, preferably a 302 (ASTM/ASME: UNS S30200) grade stainless steel. Furthermore, the bolt may be formed, at least in part, by cold forming techniques, which may produce stronger bolts than by machining or casting techniques.

The bolt 12 described herein has been found to include a unique combination of features and characteristics well suited for use in hoist ring assemblies 10. The bolt provides a structure well suited for the loads applied to a hoist ring assembly and the repetitive use of the hoist ring assembly. Further the bolt configuration is well adapted for the harsh environments wherein these devices are used. The inclusion of a bolt tensile stress indicator 170 ensures full tension engagement into the threaded hole of the object to be lifted, which is a critical joint in lifting operations. The tensile stress indicator 170 provides visual confirmation of the proper bolt tightness (i.e. preload) even at a time after attachment of the hoist ring assembly to the load. This is based on a combination of materials and design wherein the weight of the lifted load is less than the predetermined preload of the bolt. As such, even though the load produces tensile stress on the bolt, the tensile stress is less than the preload of the bolt and the tensile stress indicator can thereby provide accurate measurements of tensile stress on the bolt.

Yet even further, the indicator can be shortened so that it can be positioned such that the I.D. hole is in and/or nearer to the bushing area of the hoist ring (not shown). This has been found to increase strength of the hoist ring device especially for shear loads during a 90 degree lift.

According to further aspects of the present invention, the hoist ring assembly and/or the bolt can include an radio frequency identification ("RFID") chip or tag that can maintain/record/transmit data relating to the hoist ring assembly and/or the use of the hoist ring assembly. The data can include the manufacturing data, test data, safety testing, repair histories, inspection certificates, and the current and/or historical tensile stress exerted on the bolt 12 for that particular hoist ring assembly. Further, the RFID chip can provide access for a user to web-based management tools associated with the data and made available from the manufacturer of the hoist ring assembly.

Figure 7:
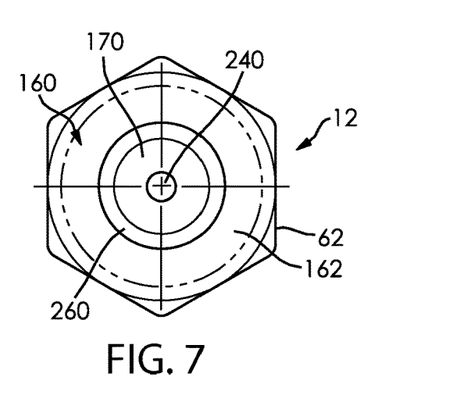
FIG. 7 is a top, head-end view of a bolt that includes a radio-frequency identification tag according to certain aspects of the invention.

The RFID chip can be any RFID chip known in the art. Further, the RFID chip could be secured relative to any component of hoist ring assembly 10 including, but not limited to, the bolt 12, the ring body 20, and/or U-bar 40. In one set of embodiments, the RFID chip or tag is incorporated into the head 62 of the bolt 12. As shown in FIG. 7, the RFID tag 260 is incorporated into the head 62 of the bolt 12, and surrounds the visible portion of the tensile stress indicator 170. Yet further, a wide range of software applications could be incorporated into RFID chip 260 or associated with the RFID chip and provided, made available, or incorporated into a radio frequency ("RF") reader, such as a smartphone with RF capability.

The RFID tags themselves can provide any desired data relating to the hoist ring assembly, and may be scanned or read in any of a variety of manners through the use of any device that includes an RF reader or scanner.

In several embodiments, the RFID tag 260 may include a microchip for storing and/or recording the data. The RFID tag 260 may also include a communication apparatus for communicating the data recorded by the microchip to a computing device that is separate and independent from the hoist ring assembly 10. The communication apparatus in the RFID tag transfers the information stored in the microchip, to a computing device for manipulation by a computer application that can be run on the computing device. The data may be manipulated by the computer application and displayed on the computing device, along with the identifying information relating to the hoist ring assembly 10.

The communication apparatus of RFID tag is not particularly limited, and in one embodiment includes a high frequency ("HF", ISO standard 15693, ISO/IEC 14443 Type A & B), RFID component, an ultra-high frequency ("UHF", EPC Class 1 Gen 2, ISO/IEC 18000-6) RFID component, a Bluetooth component, a Bluetooth low energy (BLE, Bluetooth 4.0) component, or a wireless local area network (WLAN & Wi-Fi) component that is configured to wirelessly communicate the data relating to the hoist ring assembly to a computing device. Such wireless platform may be supported by the microchip or an additional wireless microchip & antenna system connected to the microchip. In one aspect, the radio frequency identification component comprises a near field communication apparatus (i.e. NFC tag), wherein the RFID tag 260 is more specifically an NFC tag 260.

Near-field communication (NFC) is a type of radio frequency communication technology that allows for read-only and read-write communications between a NFC-enabled RF reader and a NFC-enabled RFID tag. NFC operation is based on inductive coupling between two loop antennas, which allows for sharing of power and data between NFC-enabled devices.

In operation, an end user, or any other person in the chain of use, can use an NFC enabled device to interrogate the NFC tag in order to receive a variety of useful content and information relating to the hoist ring assembly 10.

Typically, interrogation is performed by "tapping" the NFC tag using an NFC mobile device such as a smart phone, for example. General content which can be delivered to the mobile device includes the information relating to the hoist ring assembly 10 that is recorded on the microchip. Often, other unique identifying information associated with the hoist ring assembly 10 is stored on the microchip besides the recorded data, such as information associated with the manufactured product including a batch number, serial number or the like. This information can be used for a variety of logistical or regulatory uses. This information is referred to herein as "item variable data" ("IVD") and can be captured digitally, for example with the use of a vision system and electronically stored in a database as a reference to the specific hoist ring assembly 10.

NFC is a set of short range wireless communication technologies, typically requiring a distance of 20 cm or less between the NFC enable device and the NFC tag. NFC operates at 13.56 MHz on ISO/IEC 18000-3 air interface and at rates ranging from 106 kbit/s to 424 kbit/s. NFC involves an initiator device and a target device. The initiator actively generates an RF field that can power a passive target. This enables NFC targets to take very simple forms, such as labels, stickers, key fobs, or cards that do not require batteries. NFC peer-to-peer communication is possible, provided both devices are powered.

NFC tags can access data and are typically read-only, but may be rewriteable. They can be custom encoded by their manufacturers or can use the specifications provided by the NFC Forum, an industry association charged with promoting the technology and setting key standards. The NFC Forum defines four types of tags that provide different communication speeds and capabilities in terms of configurability, memory, security, data retention and write endurance. Tags currently offer between 96 and 4,096 bytes of memory.

As with proximity card technology, near-field communication uses magnetic induction between two loop antennas located within the near field of each of the initiator and the target devices, effectively forming an air-core transformer. Near-field communication operates within the globally available and unlicensed radio frequency ISM band of 13.56 MHz. Most of the RF energy is concentrated in the allowed ±7 kHz bandwidth range, but the full spectral envelope may be as wide as about 1.8 MHz when using ASK modulation. Supported data rates include 106, 212 or 424 kbit/s (the bit rate 848 kbit/s is not compliant with the standard ISO/IEC 18092).

There are two modes for NFC. In a passive communication mode, the initiator device provides a carrier field and the target device answers by modulating the existing field. In this mode, the target device may draw its operating power from the initiator-provided electromagnetic field, thus making the target device a transponder. In an active communication mode; both initiator and target device communicate by alternately generating their own fields. A device deactivates its RF field while it is waiting for data. In this mode, both devices typically have power supplies. As described herein, the present subject matter may involve an NFC-enabled (or HF-enabled) device as an initiator, and an unpowered NFC tag 260 incorporated into the label, which is attached to a hoist ring assembly 10, and/or on bolt 12 itself. Hence communication occurs via a passive mode, wherein the NFC tag 260 is not required to have power source. However, the present subject matter also includes systems using an active communication mode wherein the NFC tag 260 is powered. In several embodiments, the embedded microchip in the NFC tag 260 supports all NFC-enabled devices and NFC standards, including the ISO14443A and ISO15693 standards.

The present inventions also includes methods of making a bolt that has the ability to handle the loads and service life of the hoist ring assembly and which utilizes a tensile stress indicator to determine proper preload on the bolt.

According several embodiments, methods of using a hoist ring assembly that includes the technology noted herein are provided. In one embodiment, a method of lifting an object includes using the tensile stress indicator to accurately tighten the hoist ring assembly to the load to be lifted with respect to a predetermined preload for the bolt. The method includes providing a hoist ring assembly as described herein. The bolt of the hoist ring is inserted and tightened in a threaded opening of an object to be lifted. It is determined by using the tensile stress indicator, whether or not the predetermined preload of the bolt has been reached. If not, the bolt is adjusted by tightening or loosening to achieve the recommended preload for the bolt based on the indication provided by the tensile stress indicator. Once the proper preload for the bolt is achieved, the object is lifted using the hoist ring assembly. The method can include monitoring the tensile stress indicator over time and to maintain the recommended preload on the bolt based on such monitoring. The method can also include removing the bolt from the threaded opening and connecting the hoist ring assembly to another object to be lifted and lifting the other object using the hoist ring assembly.

In another embodiment, a method of using the hoist ring assembly is provided and includes monitoring the tensile stress on the bolt opening over time, such as by continuously or intermittently observing the tensile stress indicator over the service life, or portions thereof, of the hoist ring assembly in order to maintain the proper preload on the bolt.

According to other aspects of the present invention, a method of producing a hoist ring assembly is provided. The method including the steps of:
  A. Providing a bolt steel for the production of a bolt 12;
  B. Cold forming the bolt steel to a desired configuration of the bolt;
  C. According to one set of embodiments, the cold forming step only produces the desired head shape and shank diameter wherein the method further includes the step of machining threads on the bolt shank;
  D. Machining a snap ring groove 70 into the shank of the bolt 12;
  E. Forming an axial bore 200 into the bolt 12;
  F. According to one set of embodiments, the axial bore 200 is formed by a machining operation wherein bore 200 is machined into the bolt from the head 62;
  G. Heat treating the bolt so that it has a Rockwell C Hardness of between about 39 and 45.
  H. Providing a tensile stress indicator 170;
  I. Installing the tensile stress indicator 170 into the axial bore 200;
  J. Configuring the tensile stress indicator and the bolt such that the load limit of the hoist ring assembly is less than the preload of the bolt so that the weight of a load to be lifted does not damage the tensile stress indicator and bolt, and does not provide a misreading of the tensile stress on the bolt;
The method can further include the steps of:
  K. Providing a hoist ring body 20;
  L. Providing a washer 22 having a washer opening 24;
  M. Providing a bushing 30 having a stem portion 80, a flange portion 82, and an opening 90 that extends from a top extent 92 to a bottom extent 94 of the bushing;
  N. Providing a bail or U-bar 40, U-bar pins 50 and U-bar locking pins 52;
  O. Providing a snap or retainer ring 71;
  P. Assembling the hoist ring assembly 10.

Assembling the hoist ring assembly can include the steps of:
A. Aligning mounting holes 41 in U-bar 40 with cross holes 121 in body 20;
B. Installing U-bar pins 50 through mounting holes 41 in the U-bar 40 and in cross holes 121 in the body 20;
C. Leaving gaps between U-bar pins 50 and mounting holes 41 in the U-bar 40 in order to allow free pivoting of the U-bar 40 about a U-bar axis defined by the U-bar pins 50;
D. Drilling holes in body 20 through U-bar pins 50;
E. Pressing locking pins 52 in the drilled holes;
F. Installing bushing 30 through opening 120 in the ring body 20;
G. Installing washer 22 on the top of the stem portion 80 of bushing 30;
H. Installing a bolt 12 from the washer side of the bushing, through the washer 22 and bushing 30;
I. Installing retaining ring 71 into groove 70 of bolt 12;
J. The method may also include installing a snap ring 71 in the snap ring groove 70 of the bolt 12 to secure the bushing relative to the bolt.

As can be appreciated, while the method described above can be done in the listed order, the order of one or more of these steps can be changed without detracting from the invention of this application.

According to yet other aspects of the present invention, a method of using a hoist ring is provided. The method including the steps of:
A. Providing a hoist ring assembly 10 having a bolt 12 with a tensile stress indicator 170;
B. Inserting bolt 12 into a threaded opening in an object to be lifted;
C. Tightening bolt 12 into the threaded opening of the object to be lifted;
D. Using tensile stress indicator 170 to determine when a predetermined preload of the bolt is achieved;
E. Lifting the object using the hoist ring assembly 10;
F. Using tensile stress indicator 170 to maintain the predetermined preload of the bolt;
G. Removing bolt 12 from the object;
H. Repeating steps B-G for other objects to be lifted.

The method may further include the step of:
I. Using an RFID chip 260 to provide data relating to the hoist ring assembly and/or the lift(s) to an operator.

Again, while the method described above can be done in the listed order, the order of one or more of these steps can be changed without detracting from the invention of this application.

According to even yet other aspects of the present invention, a method is provided for testing tensile stress on a bolt of a hoist ring assembly to determine proper tightening based on predetermined preload for the bolt. The method including the steps of:
A. Providing a hoist ring assembly 10 for use in a lifting operation;
B. Tightening a bolt 12 of the hoist ring assembly in a threaded hole in the object to be lifted, the bolt including a tensile stress indicator 170;
C. Determining proper tightening of the bolt by measuring bolt elongation using the tensile stress indicator.

The method may further include the steps of:
D. Loosening the bolt 12; and,
E. Removing the hoist ring assembly 10 from the object after the lifting operation is completed.

The method may further include repeating steps A-E a plurality of times for the same or other objects.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

What is claimed is:

1. A hoist ring assembly comprising:
a bolt including a head, a shank, and an axial bore extending from the head and into the shank, the axial bore including a first end defining an opening at the head of the bolt, the opening being covered by a window, and a second distal end, the bolt being selectively securable to an associated object to be lifted by the hoist ring,
a non-adjustable tensile stress indicator that is visible through the window and adapted to indicate when a single set tensile stress in the bolt is reached, the tensile stress indicator including,
an actuating rod positioned in the axial bore, a lower end of the actuating rod being fixed relative to the second distal end of the axial bore, an upper end of the actuating rod including a indicating surface, and
light-absorbing fluid positioned in the axial bore;
a bushing extending about a portion of the bolt, the bushing including a stem, the bolt being rotatably secured relative to the bushing;
a ring body rotatably secured relative to the stem of the bushing;
a load-lifting device pivotably mounted to the ring body,
wherein the bolt has a predetermined preload, the hoist ring assembly has a predetermined load limit, and the load limit of the hoist ring assembly is less than the predetermined preload of the bolt, the single set tensile stress of the non-adjustable tensile stress indicator being permanently set to the predetermined preload of the bolt that is less than a proof load of the bolt,
wherein, when the tensile stress in the bolt is below the predetermined preload of the bolt, the indicating surface is at least closely adjacent to the window and is visible through the window,
wherein when the bolt is subject to tensile stress, the indicating surface is pulled away from the window thereby creating a gap between the indicating surface and the window, the light-absorbing fluid enters the gap, and the light-absorbing fluid in the gap becomes visible through the window, and
wherein when the tensile stress in the bolt reaches the predetermined preload, the light-absorbing fluid in the gap is visible through the window.

2. The hoist ring assembly according to claim 1, wherein the indicating surface has a color that is different from a color of the light-absorbing fluid.

3. The hoist ring assembly according to claim 1, wherein the load limit of the hoist ring assembly is 5-70% of the predetermined preload of the bolt.

4. The hoist ring assembly according to claim 3, wherein the load limit of the hoist ring assembly is about 10-50% of the predetermined preload of the bolt.

5. The hoist ring assembly according to claim 4, wherein the bolt has a predetermined proof load, the predetermined proof load of the bolt being about 4-8 times the load limit of the hoist ring assembly.

6. The hoist ring assembly according to claim 5, wherein the predetermined preload of the bolt is about 30-90% of the predetermined proof load of the bolt.

7. The hoist ring assembly according to claim 1, wherein:
the first end of the axial bore comprises an upper portion having a diameter that is larger than a diameter of a remainder of the axial bore;
the actuating rod includes a disc defining the indicating surface; and
the disc is positioned in the upper portion of the axial bore.

8. The hoist ring assembly according to claim 7, wherein the actuating rod is fixed at least near the second distal end of the axial bore by a friction fitting.

9. The hoist ring assembly according to claim 1, wherein the shank of the bolt includes a snap ring groove into which a snap ring is fitted to rotatably secure the bolt relative to the bushing.

10. The hoist ring assembly according to claim 1, wherein the head of the bolt comprises a hex head.

11. The hoist ring assembly according to claim 1, wherein the bolt has a predetermined proof load, the proof load of the bolt being about 5 times the load limit of the hoist ring assembly.

12. The hoist ring assembly according to claim 11, wherein the predetermined preload of the bolt is about 60% of the proof load of the bolt.

13. A method of lifting an object with a hoist ring comprising:
a. providing a hoist ring assembly including,
a bolt including a head, a shank, and an axial bore extending from the head and into the shank, the axial bore including a first end defining an opening at the head of the bolt, the opening being covered by a window, and a second distal end, the threaded portion having an external threaded portion that extends from a base of the hoist ring,
a non-adjustable tensile stress indicator that is visible through the window and adapted to indicate when a single set tensile stress in the bolt is reached, the tensile stress indicator including an actuating rod positioned in the axial bore, a lower end of the actuating rod being fixed to the bolt at least near the second distal end of the axial bore, an upper end of the actuating rod including a indicating surface, a light-absorbing fluid positioned in the axial bore,
a bushing extending about the bolt and including a stem,
a ring body rotatably mounted about the stem of the bushing
a load-lifting device pivotably mounted to the ring body,
wherein the bolt has a predetermined preload, the hoist ring assembly has a predetermined load limit, and the load limit of the hoist ring assembly is less than the preload of the bolt,
wherein, when the tensile stress in the bolt is less than the predetermined preload, the indicating surface is at least closely adjacent to the window and is visible through the window;
wherein when the bolt is subject to tensile stress, the indicating surface is pulled away from the window thereby creating a gap between the indicating surface and the window, the light-absorbing fluid enters the gap, and the light-absorbing fluid in the gap becomes visible through the window, and
wherein when the tensile stress in the bolt reaches the predetermined preload, the light-absorbing fluid in the gap is visible through the window
b. positioning the external threaded portion that extends from the base of the hoist ring into a single threaded opening of an object to be lifted
c. rotating the bolt relative to the bushing and the object to be lifted to tighten the bolt of the hoist ring in the single threaded opening of the object to be lifted; and,
d. determining when the predetermined preload of the bolt has been achieved during the rotating step based on an amount of the light-absorbing fluid in the gap.

14. The method according to claim 13, further including the step e) of lifting the object using the hoist ring assembly when the predetermined preload of the bolt is achieved.

15. The method according to claim 14, further including removing the bolt from the threaded opening and repeating steps b-e for another object to be lifted.

16. The method according to claim 13, wherein the load limit of the hoist ring assembly is 5-70% of the preload of the bolt.

17. The method according to claim 13, wherein the bolt has a predetermined proof load, the proof load of the bolt being about 5 times the load limit of the hoist ring assembly.

18. The method according to claim 17, wherein the preload of the bolt is about 60% of the proof load of the bolt.

* * * * *